United States Patent [19]
Becker

[11] 4,002,453
[45] Jan. 11, 1977

[54] ARRANGEMENT FOR FEEDING GOBS OF PLASTICIZABLE MATERIAL IN MOLDS OF A MACHINE FOR THE PRODUCTION OF BOTTLES OR THE LIKE

[75] Inventor: Kurt Becker, Obernkirchen, Germany

[73] Assignee: Hermann Heye, Obernkirchen, Germany

[22] Filed: Oct. 10, 1973

[21] Appl. No.: 405,047

Related U.S. Application Data

[60] Continuation-in-part of Ser. No. 197,075, Nov. 9, 1971, Pat. No. 3,803,877, which is a division of Ser. No. 716,196, March 26, 1968, Pat. No. 3,622,305.

[30] Foreign Application Priority Data

Apr. 1, 1967 Germany .............................. 62338

[52] U.S. Cl. ................................. 65/207; 65/229; 65/304
[51] Int. Cl.² .......................................... C03G 5/30
[58] Field of Search ............. 65/304, 223, 207, 229
[56] References Cited

UNITED STATES PATENTS

| | | |
|---|---|---|
| 1,331,511 | 2/1920 | La France ....................... 65/207 X |
| 2,810,236 | 10/1957 | Mumford ............................. 65/223 |
| 2,926,457 | 3/1960 | Trudeau .............................. 65/223 |
| 2,958,159 | 11/1960 | Denman ........................... 65/304 X |
| 3,025,637 | 3/1962 | Lauck .................................. 65/304 |
| 3,895,931 | 7/1975 | Hamilton ............................ 65/304 |

*Primary Examiner*—S. Leon Bashore
*Assistant Examiner*—Frank W. Miga
*Attorney, Agent, or Firm*—Michael J. Striker

[57] ABSTRACT

An arrangement for successively feeding gobs of plasticizable material into blank molds arranged on a turntable of a bottle making machine from a gob supply means stationarily arranged relative to the turntable. The feeding arrangement preferably comprises a feed channel for each mold and means carried by the turntable and supporting each feed channel at two points at different elevations. The support means are adjustable during rotation of the turntable in such a manner so as to successively align the upper end of each feed channel with the gob supply means for receiving a gob therefrom, and the lower end with the respective mold for supplying the received gob into the latter while a press plunger cooperating with the mold is in an upwardly withdrawn position.

14 Claims, 9 Drawing Figures

FIG.5
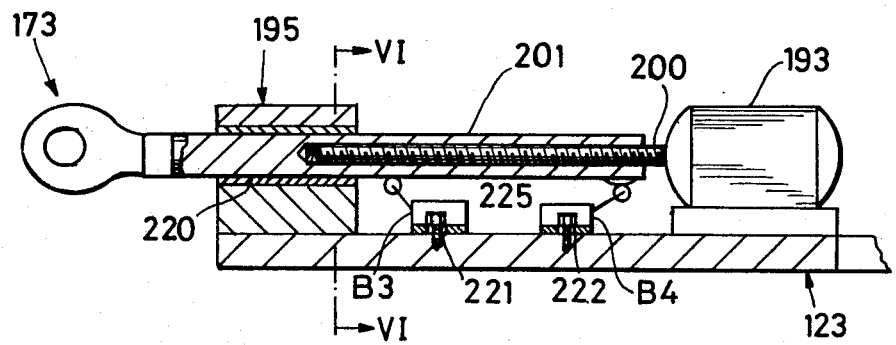
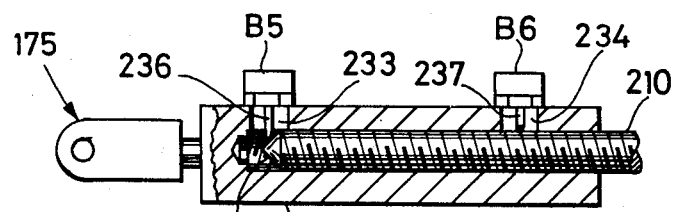
FIG.7
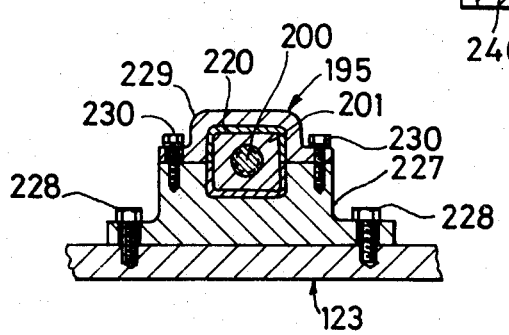
FIG.6

ARRANGEMENT FOR FEEDING GOBS OF PLASTICIZABLE MATERIAL IN MOLDS OF A MACHINE FOR THE PRODUCTION OF BOTTLES OR THE LIKE

CROSS-REFERENCE TO RELATED APPLICATION

The present application is a continuation-in-part application of the copending application Ser. No. 197,075 filed Nov. 9, 1971, now U.S. Pat. No. 3,803,877, which in turn is a divisional application of the application Ser. No. 716,196 filed Mar. 26, 1968 and now U.S. Pat. No. 3,622,305.

BACKGROUND OF THE INVENTION

The present invention relates to an arrangement for feeding gobs of plasticizable material from a stationary gob supply means into a plurality of molds of a machine for the production of bottles or the like from plasticizable material in which the plurality of molds are arranged circumferentially spaced from each other on a turntable continuously rotatable about a vertical axis.

In a known arrangement of this type disclosed in the French Pat. No. 990,183, a gob supply means cooperates with a plurality of gob feeding channels. In this known construction, each feed channel is mounted on a vertical shaft which can be selectively tilted about its axis by means of a fluid operated motor. In this known machine there are a plurality of turntables arranged about a stationary column, each turntable about its axis and each carrying a plurality of molds circumferentially spaced from each other. Each of the turntables is intermittently turned through an angle corresponding to the spacing of two adjacent molds on this turntable. The feed channels and the fluid motors for tilting the same are mounted on the stationary central column, and the respective feed channel which has to feed a gob from the stationary gob supply means into a mold on one of the turntables is tilted by the fluid motor cooperating therewith to align the upper end of the respective feed channel with the stationary gob supply means and the lower end of the feed channel with the mold on the respective turntable to be supplied, while the mold is in stationary position. This known feeding arrangement has the disadvantage that it can be used only with a machine in which the turntables are intermittently moved so that the output of such a machine will evidently be a small one.

SUMMARY OF THE INVENTION

It is an object of the present invention to provide a gob feeding arrangement which avoids the disadvantages of the above-described feeding arrangement known in the art.

It is a further object of the present invention to provide a gob feeding arrangement usable to supply gobs into a plurality of molds of a machine for the production of bottles or the like in which the turntable carrying the plurality of molds is continuously rotated about a vertical axis.

It is an additional object of the present invention to provide such a gob feeding arrangement which is constructed of relatively simple parts so that the arrangement may be manufactured at reasonable cost and will stand up properly under extended use.

With these and other objects in view, which will become apparent as the description proceeds, the present invention relates to an arrangement in a machine for the production of bottles or similar hollow articles from plasticizable material and comprising means rotatable about a substantially vertical axis, a plurality of molds carried by the rotatable means radially spaced from the axis and circumferentially spaced from each other and each having vertical axis, a plunger for each mold carried by the rotatable means reciprocable along the axis of the respective mold between an active position in which a lower end of the plunger extends into the respective mold and an upwardly withdrawn inactive position, means located at a higher elevation than the molds and having a vertically downwardly extending outlet for successively supplying gobs of plasticizable material, and means for feeding such gobs seriatim from said gob supply means into said molds during movement of the latter with said rotatable means. The feeding means preferably comprise a plurality of feed channels, one for each mold, and each having an upper and a lower end, and support means for each of the feed channels carried by the rotatable means for movement therewith and connected to the respective feed channel at points of different elevations for periodically aligning the upper end of the respective feed channel with the outlet of the gob supplying means for receiving a gob from the latter and for periodically aligning the lower end of the feed channel with the respective mold for feeding the received gob into the mold while the plunger coordinated therewith is in the upwardly withdrawn inactive position.

The gob supplying means is preferably aligned with the vertical axis of the rotatable means. Preferably, each of the feed channels is movable in a vertical plane which includes the vertical axis of the rotatable means and the axis of the respective mold.

The upper one of the support means for each feed channel is pivotally connected at one end to the channel and a positioning motor carried by the rotatable means is connected to the upper support means for periodically aligning the upper end of the respective feed channel with the outlet of the gob supplying means. Preferably, the positioning motor has an output member rotatable about an axis and each of the upper support means preferably comprises an elongated first member having a longitudinal axis and being pivotally connected to the respective feed channel means fixedly mounted on the rotatable means for guiding the first member reciprocable in direction of its longitudinal axis, but non-rotatable about this axis, a second elongated member connected to the output member of the positioning motor for rotation therewith, and connecting means connecting the first to the second member for moving the first member in direction of its axis during rotation of the second member. The first member has preferably in a plane normal to its axis a non-circular cross section and the aforementioned guide means is provided with a guide passage of corresponding cross section through which the first member extends, and the connecting means preferably comprise a female screw thread on one of the members and a male screw thread on the other of the members and threadingly engaged with the female screw thread.

The lower one of the support means for each channel is connected at one end to the channel for pivoting about an axis extending transverse to the elongation of the respective channel and a second positioning motor carried by the rotatable means is connected to the other end of the lower support means for pivoting the respective channel about the one end of the respective upper support means so as to align the lower end of the channel with the axis of the respective mold. The lower support means preferably comprises a sleeve member provided with a female screw thread and a spindle member provided with a male screw thread threadingly engaged with the female screw thread. One of these two members is connected to the channel whereas a universal joint connects the other of the two members to the output member of the second positioning motor.

Since each of the molds is provided with its own feed channel, a gob emanating from the outlet end of the stationary gob supply means can be received at the upper end of the respective feed channel in the respective circumferential position of the latter, whereas the lower end of the feed channel need to be aligned with the respective mold only shortly before the gob reaches the lower end of the respective feed channel. In this way it is possible to rotate the rotatable means carrying the molds continuously and with relative high circumferential speed, and while each of the feed channels will at any time contain only a single gob, the plurality of feed channels may each have at this time a gob located at different elevations on its way to the mold coordinated therewith.

The aforementioned positioning motors are preferably reversible electromotors, and the arrangement preferably comprises a pair of cam means mounted on the rotatable means for turning therewith about a vertical axis, a pair of reversing switches for each of the positioning motors stationarily mounted for cooperation with the cam means spaced in circumferential direction of the rotational means and in circuit with the motors for reversing the direction of rotation thereof, and a pair of stop switches for each of the positioning motors and respectively cooperating with the respective support means for starting and stopping the motor when the two members of the respective support means reach predetermined positions relative to each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 5 is a side view of the upper support means for a feed channel, partly in cross section;

FIG. 6 is a cross section taken along the line VI-VI of FIG. 5;

FIG. 7 is a partial cross section through the lower supporting means;

DESCRIPTION OF THE PREFERRED EMBODIMENTS

Figure 1:
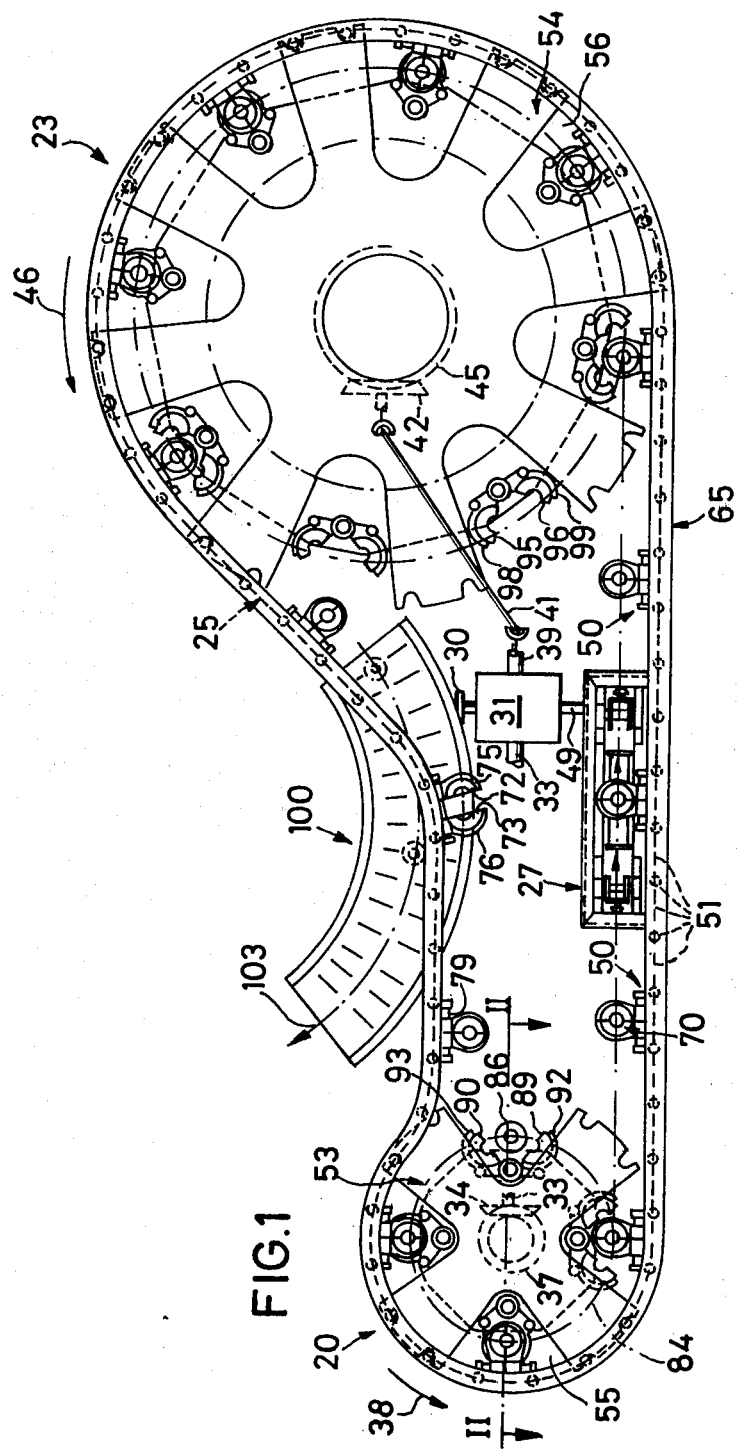
FIG. 1 is a schematic top view of a press-and-blow machine having a turntable carrying a plurality of blank molds provided with the gob feeding means according to the present invention.

FIG. 1 schematically illustrates a so-called press-and-blow bottle making machine which essentially comprises two rotatable means or turntables, that is a turntable 20 for carrying a plurality of blank or press molds to be supplied with gobs of plasticizable material and a turntable 23 carrying blow molds for final blowing of semi-finished articles or parisons produced in the blank molds. The two turntables are connected to each other by an endless chain conveyor 25. The turntables 20 and 23 and an auxiliary treating station 25 located therebetween are synchronously driven from a motor, not shown in FIG. 1, which over a coupling 30 is connected with a gear unit 31. The gear unit 31 has three rotatable output members. The output member 33 of the gear unit drives over the pair of bevel gears 34 and 37 the turntable 20 in direction of the arrow 38, the output member 39 drives over a cardan shaft 41 and a pair of bevel gears 42 and 45 the turntable 23 in the direction of the arrow 46, whereas the third output member 49 of the gear unit leads to the auxiliary station 27 and drives the latter. The conveyor chain 25 comprises a plurality of dollies or carriages 50 which are connected to each other by links 51. The links 51 are elastically extensible and contractable within certain limits to permit a change of the length of the chain, which in the region of the turntables 20 and 23 is respectively guided over chain sprockets 53 and 54. The sprockets 53 and 54 are in the region of the molds carried by the turntables provided with essentially V-shaped cutouts 55 and 56. The portions of the sprocket wheels 53 and 54 between the cutouts, that is the actual drive and guiding portions of the sprockets, are respectively in engagement between two successive carriages 50 with rollers 58 and 59 carried by the connecting links 51, as shown in FIG. 2.

Figure 2:
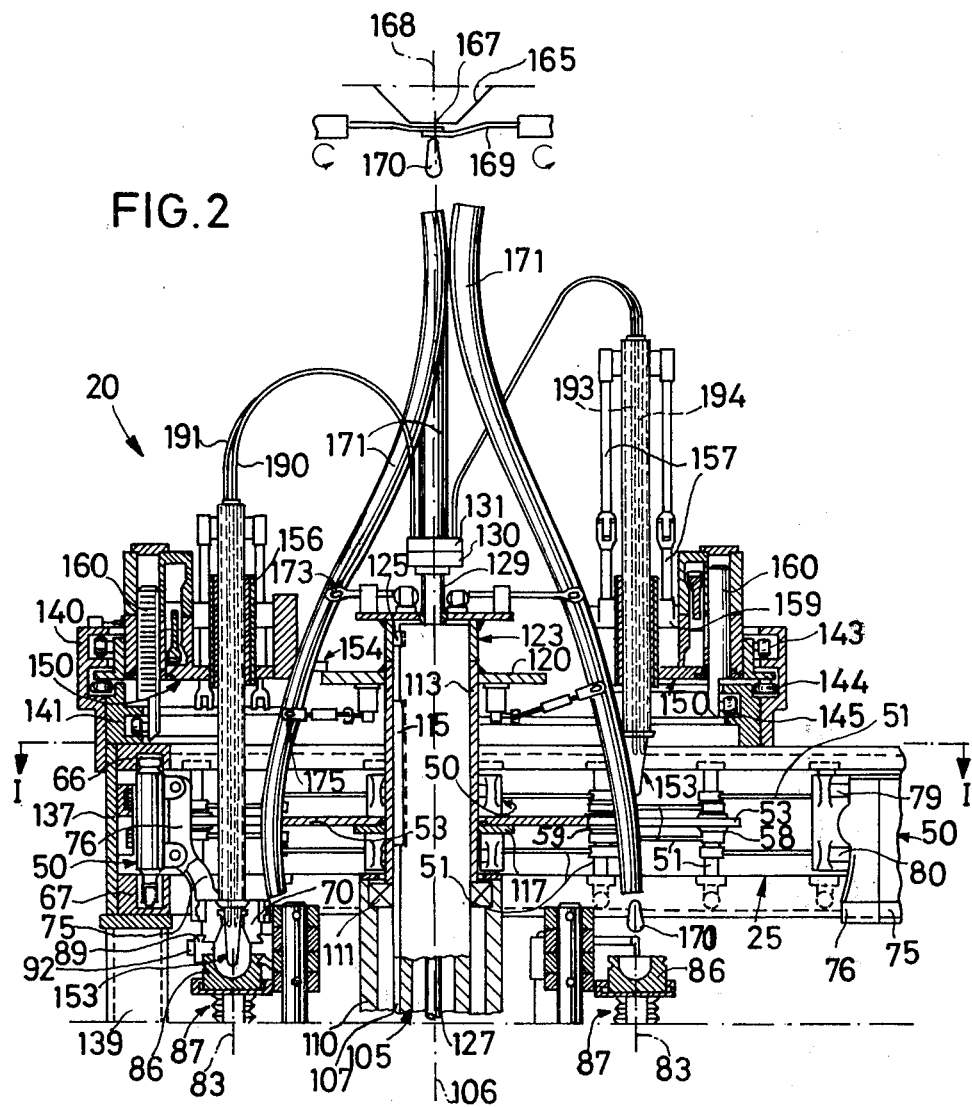
FIG. 2 is a schematic cross section taken along the line II—II of FIG. 1 and drawn to a larger scale than FIG. 1.

The carriages 50 and the connecting links 51 are guided along an endless track 65 which has, as shown in FIG. 2, an upper guide rail 66 and a lower guide rail 67, each of U-shaped cross section.

Each carriage 50 carries a neck ring 70 for forming the neck of a bottle or similar hollow container. Each neck ring 70 comprises two neck ring halves 72 and 73 respectively suspended in neck ring support members 75 and 76. Cooperating support members 75 and 76 are movable substantially in a plane on two guide rods 79 and 80 relative to each other (FIG. 2) in order to open and close the neck ring 70. An integral guide ring, not shown in the drawing, is by means of a radially outwardly extending flange normally suspended in the neck ring halves 72 and 73, and the flange prevents the guide ring from dropping out of the neck ring halves during opening of the latter. The neck rings 70 are constructed for cooperation with the press molds carried by the turntable 20 as well as with the blow molds carried by the turntable 23.

The turntable 20 is in the illustrated embodiment provided with four press or blank molds which are carried uniformly spaced in circumferential direction in the region of the outer periphery of the turntable 20. The vertically extending axes 83 (FIG. 2) of the press molds will move during continuous rotation of the turntable 20 along an imaginary cylinder indicated in FIG. 1 by the circle 84. Each of the press molds comprises an integral mold part 86 supported on a spring leg 87 slightly movable in horizontal and also in vertical direction by means known in the art and not illustrated in the drawing, and two intermediate mold halves 89 and 90 which are respectively suspended on support members 92 and 93 and cooperate with the mold part 86. The mechanism for opening and closing the support members 92 and 93 are known per se and are therefore not described in the present application. The intermediate mold halves 89 and 90 embrace and clamp during closing of the blank mold the part 86 on the spring leg 87 as well as the respective neck ring parts of the neck ring 70, as shown at the left lower part of FIG. 2.

The turntable 23 is provided in a similar manner with a plurality of blow molds. In the illustrated embodiment eight blow molds are provided for the turntable 23 and each of the eight blow molds comprises a non-illustrated bottom part and two blow mold halves 95 and 96 which are respectively suspended in prong parts 98 and 99 which in known manner are movable toward and away from each other.

The parisons formed in the press molds on the turntable 20 leave the latter suspended on the neck rings 70 by means of which the parisons are transported to the auxiliary station 27 in which they are further treated. Subsequently, the parisons are transported by the neck rings to the blow molds on the turntable 23, in which the parisons are blown to a finished hollow container. The finished containers leave the turntable 23 on the neck rings 70 which respectively open upon reaching a belt conveyor 100 so that the finished articles will drop on this belt conveyor. The articles are transported by the belt conveyor 100 in the direction of the arrow 103 into a cooling oven of known construction and not shown in the drawing.

FIG. 2 more clearly illustrates the upper part of the turntable or rotatable means 20 which is of interest for the present invention. As shown in FIG. 2, there is provided a central hollow shaft 105, having a vertical axis 106, to which the turntable 20 as well as the sprocket wheel is fixedly connected for rotation therewith, and which is driven by means of the sprocket gears 34 and 37 from the output members 33 of the gear unit 31, in the manner as described above. The hollow shaft 105 is surrounded by a stationary tubular member 110 carrying a plurality of roller bearings 111, only the uppermost of which is shown in the drawing, which rotatably support the hollow shaft 105. The inner ring of the uppermost roller bearings 111 carries an upwardly extending sleeve 113 connected to the hollow shaft 105 for rotation therewith by means of a key 115 engaged in a longitudinal groove 107 formed in the outer periphery of the hollow shaft. A radially outwardly projecting flange 117 on the sleeve 113 carries fixedly connected thereto the sprocket wheel 53. Upwardly spaced from the flange 117 the sleeve 113 carries additional, a radially outwardly extending flange 120. A cup-shaped cover 123, provided with a central opening 124 (FIG. 4), is mounted on the upper end of the sleeve 113. The cover 123 is connected by means of a key 125 with the hollow shaft 105 for rotation therewith.

A stationary tube 127 extends through the interior of the hollow shaft 105. The tube 127 carries fixedly connected to the upper end a tubular connecting member 129 which carries a number of slip rings 130 forming part of a rotary distributor for electrical energy and a rotary distributor 131 for compressed air. Compressed air is fed through the tube 127 and the tubular connecting member 129 to the rotary distributor 131 from a source of such compressed air, not shown in the drawing. The electrical connection between the slip rings 130 and a source of electrical energy, not shown in the drawing, is made by a cable 135 (FIG. 4) provided in the interior of the tube 127 and the tubular connecting member 129.

As shown in FIG. 2, the guide rails 66 and 67 of the endless track 65 are connected by rigid plates 137, only one of which is shown in FIG. 2, and supported on a plurality of uprights 139. Tracks 140 and 141 are connected to the upper end of plate 137 for rollers 143, 144 and 145.

The rollers 143 and 144 support and guide four frames 140, each of which supports the guiding and drive elements of a plunger 153 cooperating with a respective one of the blank molds. Each of the frames 150 is connected at 154 to the flange 120 for movement therewith.

Each plunger 153 is mounted reciprocably in vertical direction in a bushing 156 carried by the respective frame 150. A crank drive 157 arranged to opposite sides of each plunger 153 serves to reciprocate the latter in axial direction between a lower active position, as shown in the left side of FIG. 2, and an upwardly withdrawn inactive position as shown on the right side of this figure. The crank drive 157 is driven by a crank shaft 159 on which a gear, not shown in the drawing, is fixedly connected which meshes with a rack 160. The rack 160 in turn is reciprocated in vertical direction by means of a roller 145 connected to the lower end thereof and cooperating with the stationarily arranged cam track 141 fixed to the plates 137. In this way each of the plungers 153 is reciprocated between its lower active and its upwardly withdrawn inactive position in dependence on the rotation of the turntable 20 about its axis.

The gob supply means 165 is stationarily arranged above the turntable 20 and has a single gob outlet 167 with a vertical axis 168. Gob shears 169 arranged closely adjacent the outlet 167 provide individual gobs 170 which respectively drop into the upper ends of four feed channels 171, preferably of tubular or of U-shaped cross-section. Each feed channel 171 is movable in a vertical plane which includes the axis 106 of the hollow shaft 105 as well as the axis 83 of the respective mold with which the feed channel is coordinated. Each of the feed channels 171 is carried by a pair of support means which are pivotally connected thereto at two points of different elevation.

Figure 3:
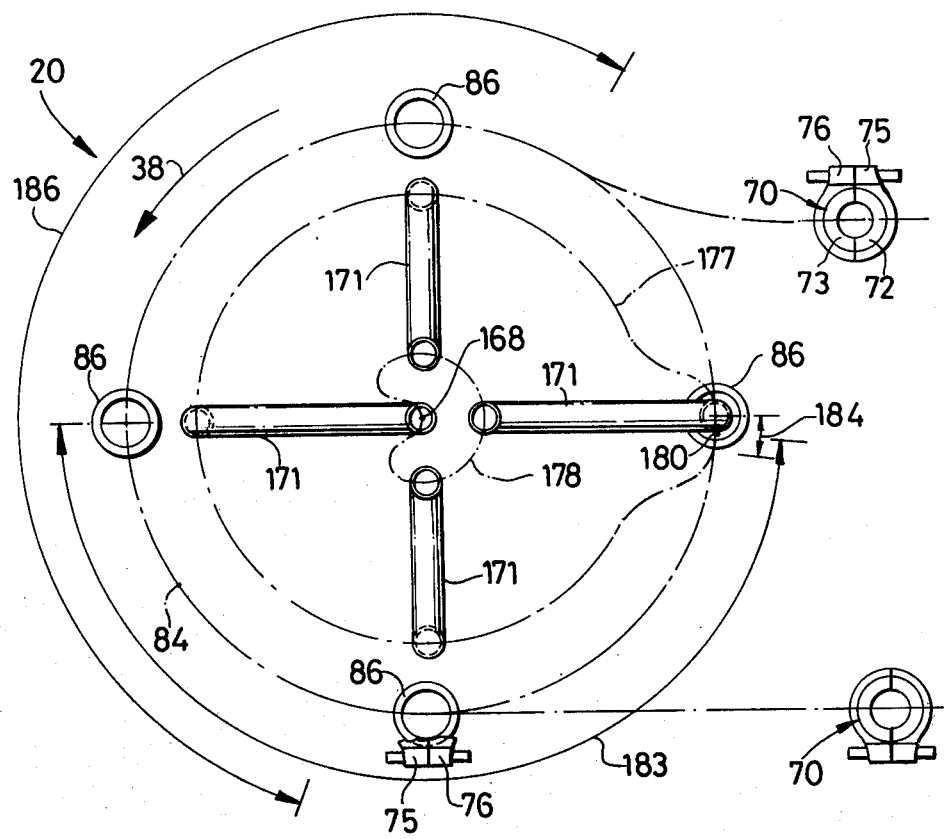
FIG. 3 is a schematic top view of the turntable with four feed channels for four blank molds carried by the turntable.

FIG. 3 schematically illustrates top view of the four feed channels 171. The lower ends of the four feed channels will move along a path 177 shown in dash-dot lines in FIG. 3, whereas the upper ends will move along the path 178 also illustrated in dash-dot lines. The major portion of each path 177 and 178 is circular and concentric with the axis 168, which means that the ends of the channels while rotating with the turntable 20 do not move relative to the turntable as long as the ends move on the respective circular portions of the aforementioned two paths. During each revolution of the turntable 20 the upper and the lower end of each channel 171 has each to be moved out of the circular path only once. More specifically, the upper end of each channel 171 has to be moved radially inwardly in alignment with the axis 168 of the outlet of the gob supply means 165, as illustrated in FIG. 3 for the channel 171 extending to the left of the axis 168. The moment, respectively the turning angle in which the upper end of the respective feed channel has to be aligned with the axis 168 for receiving a gob 170 will depend from a plurality of construction parameters and the number of revolutions per minute performed by the turntable 20. Necessary in each case is that the gob 170 sliding downwardly in the respectively feed channel 171 will leave the lower end thereof at a point 180, in which the lower end of the respective channel 171 is aligned with the respective mold part 86 carried by the turntable. The greater the number of revolutions per minute of the turntable 20 is, the greater must be the angle 183 between the point 180 and the position of the respective feed channel 171 in which its upper end receives a gob 170. To assure proper feeding of the gob from the lower end into the respective mold, the outwardly extended portion of the path 177 described by the lower end of each feed channel coincides with the circular path 84 described by the molds during rotation of the turntable not only at the point 180 but through an angular region 184. This will assure that the gob leaving the lower end of the respective feed channel will be positively fed into the part 86 of the respective blank mold. In FIG. 3, the feed channel extending toward the right of the axis 168 is shown in a position in which the lower end of the feed channel 171 is aligned with the respective mold member 86 for feeding a gob 170 into the latter.

Since each plunger 153 is during rotation of the turntable through the angle 186 in its lower active position within the respective blank mold, it is necessary that the lower end of each feed channel 171 moves, at least during turning of the turntable through the angle 186, along the major circular portion of the path 177 so as to avoid collision between the plungers 153 and the feed channels 171.

Figure 4:
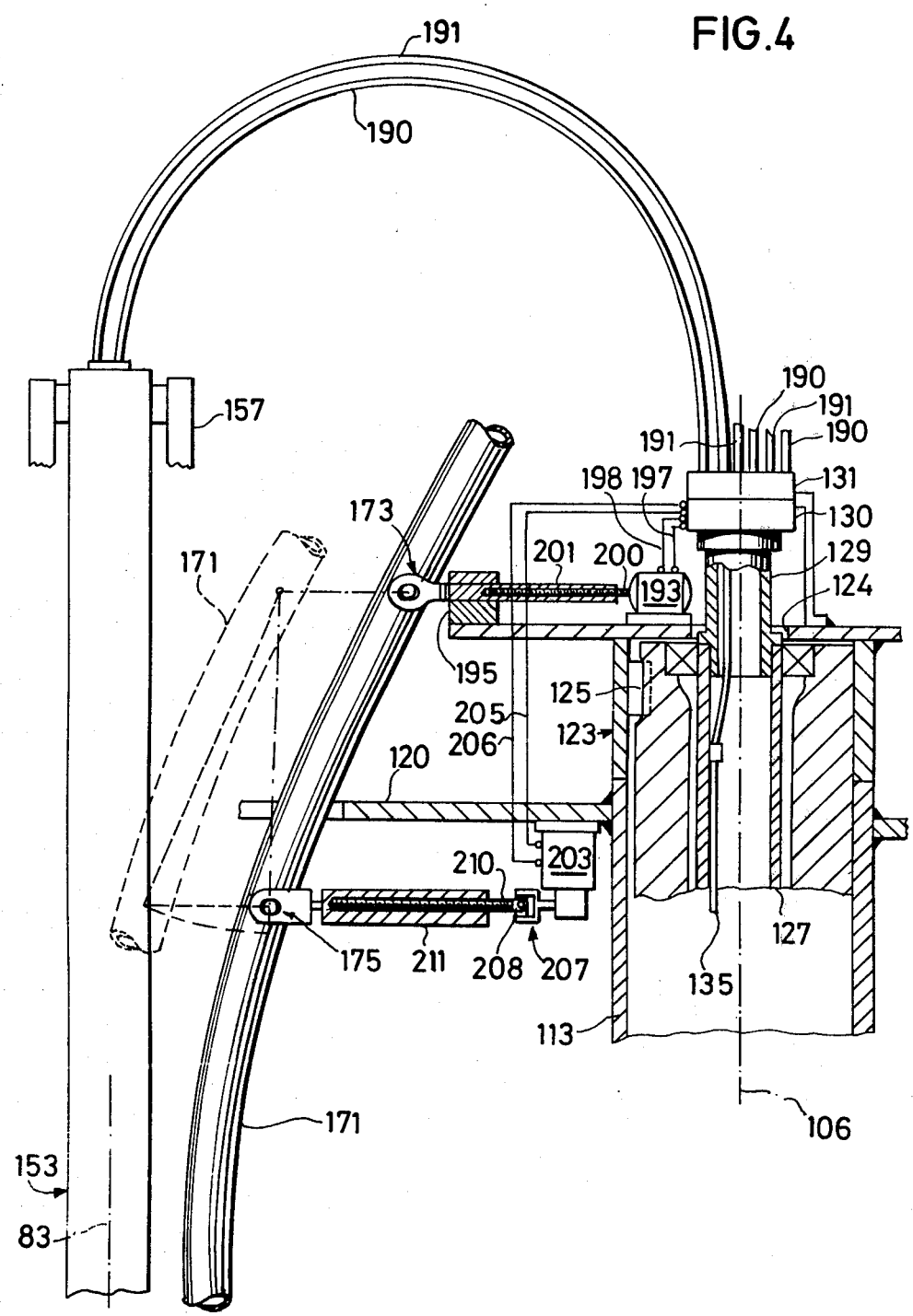
FIG. 4 is a partial cross section similar to that shown in FIG. 2 and drawn to a larger scale than the latter.

FIG. 4 illustrates how each of the plungers 153 is connected by flexible conduits 190 and 191 with the rotary compressed air distributor 131. Conduits 193 and 194 (FIG. 2) connected to the flexible conduits 190 and 191 extend longitudinally through the plunger 153 for passing compressed air serving as cooling medium through the plunger. If a liquid cooling medium is used, then a corresponding feed line and return line for this liquid cooling medium are provided in the interior of the tube 127 and the connecting tubular member 129 to the rotary distributor 131 which is connected to the cover 123 for rotation therewith.

FIG. 4 further illustrates details of the upper and lower support means for supporting each of the feed channels 171. As shown in FIG. 4, the upper support means 173 preferably comprises a first elongated member 201 which is preferably formed with a central bore extending from the right end, as viewed in FIG. 4, partially therethrough and being provided with an inner screw thread and a second member 200 in form of a spindle provided with an outer or male screw thread threadingly engaged with the female screw thread on the member 201. The spindle 200 is connected at its right end, as viewed in FIG. 4, with the shaft of an electromotor 193 mounted on the cover 123 and supplied with electrical energy from the slip rings 130 through conductors 197 and 198. The outer free end of the member 201 is preferably fork-shaped and pivotally connected to the respective feed channel 171 so that the latter may tilt about an axis extending transverse to the elongation of the channel. The first member 201 has in a plane normal to its elongation a non-circular, preferably square or rectangular, configuration guided in a guide passage of corresponding cross-section of a guide member 195 mounted in fixed position on the cover 123.

The lower support means 175 arranged below the flange 120 comprises a sleeve member 211 provided in an axial bore thereof with a female screw thread and connected with a fork-shaped left-end as viewed in FIG. 4, pivotally to the respective feed channel 171, and a spindle member 210 provided with a male screw thread threadingly engaged with the female screw thread on the sleeve member 211. The right end, as viewed in FIG. 4 of the spindle member 210 is connected to the drive shaft of a universal joint 207, which in turn, is connected to the drive shaft or output member of an electric positioning motor 203 mounted on the flange 120 and supplied from the slip rings 130 with electrical energy through conductors 205 and 206. It is to be understood that for each of the motors 193 and 203 there are provided two slip rings, which for reason of simplification is not shown in FIG. 4.

FIG. 4 illustrates in dotted lines a portion of one feed channel 171 in a position in which the support means 173 and 175 are moved to their extended positions, which corresponds to the position of the feed channel 171 which is illustrated at the right side of FIG. 3. The position of the feed channel 171 shown in full lines in FIG. 4 corresponds to the position of the feed channel shown at the left side of FIG. 3.

FIG. 4 further illustrates in a dash-dotted line a connection line between the pivot points of a feed channel when the latter is in a position of the feed channels 171 which extend upwardly and downwardly, as viewed in FIG. 3, from the center line 168.

FIG. 5 further illustrates a pair of stop switches $B_3$ and $B_4$ mounted on a flange of the cover 123 spaced in longitudinal direction of the member 201 of the upper support means 173 from each other and each having an actuating portion adapted to cooperate with a cam projection 225 located at the right end, as viewed in FIG. 5, on the member 201. These stop switches are connected in circuit with the positioning motor 193 as will be explained later on. The stop switches $B_3$ and $B_4$ are connected by screws to the flange of the cover 123. The screws extend through elongated slots 221 and 222, respectively, in the switches so that the position of the stop switches relative to each other and the cam projection 225 is adjustable within certain limits.

As shown in the cross section of FIG. 6, the guide member 195 comprises a lower block 227 connected by screws 228 to the cover 123. Half of a bearing bushing 220 is imbedded in the lower block 227 and the other half of the bearing bushing is located in a cover 229, which is connected by screws 230 to the lower block 227. The member 201, which has, as mentioned before, a substantially rectangular or square cross section, is guided for movement in longitudinal direction in the bearing bushing 220 so as to be prevented from turning about its axis.

The sleeve member 211 of the lower support means 173 is provided, as shown in FIG. 7, with two elongated slots 233 and 234 extending in longitudinal direction of the member 211 and being spaced in this direction from each other, through which the actuating portions 236 and 237 of an additional pair of stop switches $B_5$ and $B_6$ respectively extend. The stop switches $B_5$ and $B_6$ are connected to the sleeve member 211 in a similar manner as described above with regard to the stop switches $B_3$ and $B_4$ so as to be adjustable within certain limits in the longitudinal direction of the sleeve member 211. The stop switches are connected in circuit with the positioning motor 203 as will be described later on. The pointed end 240 of the spindle member 210 is adapted, during its movement within the sleeve member 211, to actuate the actuating portion 236 and 237 of the two stop switches.

Figure 8:
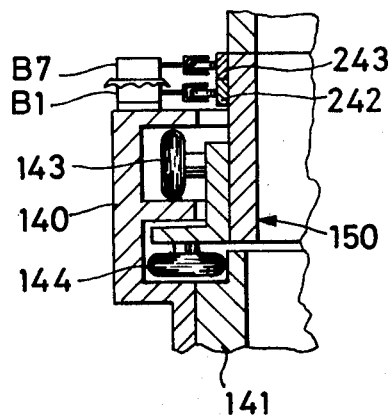
FIG. 8 is a cross section of a detail of FIG. 2 drawn to an enlarged scale.

As shown in FIG. 8, two cam tracks 242 and 243 are connected to the frames 150 which rotate together with the turntable 20 and while the cam tracks are shown in FIG. 8 only in cross section, it is to be understood that these cam tracks are of substantially annular configuration extending about the axis 106. The cam track 242 cooperates with eight switches only one of which, $B_1$, is shown in the partial cross section of FIG. 8, and these switches are arranged circumferentially spaced from each other and connected adjustable with respect to each other on the track 140 which, as mentioned before, is stationarily arranged. Each two of the eight switches, e.g., $B_1$, are respectively in circuit with a respective position motor 193 for the upper support means 173 in the manner as will be described later on.

In a similar manner, eight switches, only one of which, $B_7$, is shown in FIG. 8, are mounted on the stationary cam track 140 adjustable with respect to each other. Each two of the second group of eight switches, e.g., $B_7$, are operated by the cam track 243 and are connected to a respective one of the positioning motors 203 for the lower support means 175 to control the latter in a manner as will be described below.

The operation of a positioning motor 193 for the upper support means 173 will now be explained on hand of the wiring diagram shown in FIG. 9. When a projecting portion on the cam track 242 actuates the switch $B_1$, which is a normally open switch, its contact $b_1$ shown in FIG. 9 will be closed. Closing of the contact $b_1$ will energize the relay C which in turn will move the contact $c_1$ connected to the relay C to the closed position and hold the contact $c_1$ in the closed position when the contact $b_1$ opens again. Energizing of the relay C will also tilt the contacts $c_2$ and $c_3$ operatively connected to this relay, from the neutral position, in which it is held by the two retriever springs 252 and 253 acting on arm 250, in counterclockwise direction so that the positioning motor 193 is energized and turns in a direction in which the spindle 200 cooperating with the sleeve member 201 is turned to move the support means 173 from the position shown in full lines in FIG. 4 to the extended position indicated in dotted lines in this Figure. This movement is continued until the cam portion 225 shown in FIG. 5 actuates the stop switch $B_3$ and momentarily opens its contact $b_3$ shown in FIG. 9. This will de-energize the relay C causing opening of the contacts $c_1$, $c_2$ and $c_3$.

Figure 9:
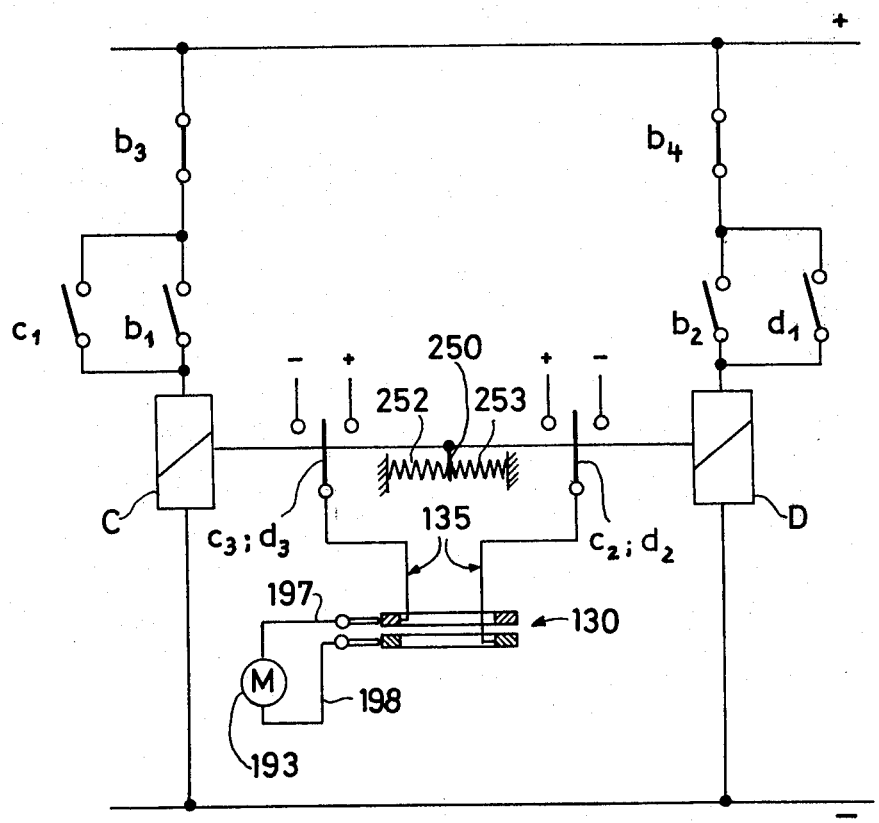
FIG. 9 is a wiring diagram illustrating supply of electric energy to and control of a positioning motor.

In order to obtain a retraction of the upper support means 173 to the position shown in full lines in FIG. 4, an other switch not shown in the drawing has to be arranged for cooperation with the cam track 242 so that during turning of the cam track through a predetermined angle the contact $b_2$ shown in FIG. 9 of this other switch will be momentarily closed. This will cause energization of a further relay D which in turn will close the holding contact $d_1$ of the relay D. Energization of the relay D will also cause movement of contacts $d_2$ and $d_3$ which are identical with the contacts $c_2$ and $c_3$ in clockwise direction so that the positioning motor 193 is again energized, but with reversed polarity, so as to run in the opposite direction than before, which causes a contraction of the upper support means 173 which will continue until the cam portion 225 actuates the stop switch $B_4$ so that the contact $b_4$ thereof, shown in FIG. 9, will be opened and the relay D will be de-energized. This opens the contact $d_1$ and the contacts $d_2$ and $d_3$, respectively $c_2$ and $c_3$ will return to the neutral position shown in FIG. 9 in full lines and the positioning motor 193 will be deenergized.

In a similar manner, the switches, e.g. $B_7$, cooperating with the cam track 243 and the stop switches $B_5$ and $B_6$ will control the motor 203 of each lower support means 175.

It will be understood that each of the elements described above, or two or more together, may also find a useful application in other types of arrangement for feeding gobs of plasticizable material into molds of machines for the production of bottles or the like differing from the types described above.

While the invention has been illustrated and described as embodied in an arrangement for feeding gobs from a stationary gob supply means into molds mounted circumferentially spaced from each other on a continuously rotating turntable, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended:

1. In a machine for the production of bottles and similar hollow articles from plasticizable material, a combination comprising means rotatable about a substantially vertical axis; a plurality of molds carried by said rotatable means radially spaced from said axis and circumferentially spaced from each other, each of said molds having a vertical axis, a plunger for each mold carried by said rotatable means reciprocable along the axis of the respective mold between an active position in which a lower end portion of the plunger extends into the respective mold and an upwardly withdrawn inactive position; means located at a higher elevation than said molds and having a vertically downwardly extending outlet for successively supplying gobs of plasticizable material; and means for feeding such gobs seriatim from said gob supplying means into said molds during movement of the latter with said rotatable means, said feeding means comprising a plurality of continuous feed channels, one for each mold, and each having an upper and a lower end, and support means for each of said feed channels carried by said same rotatable means for movement therewith about said vertical axis and connected to the respective feed channel for periodically aligning the upper end of the respective feed channel with said outlet end of said gob supplying means for receiving a gob from the latter and for periodically aligning the lower end of the feed channel with the respective mold for feeding the received gob into said mold while the plunger coordinated with said mold is in said upwardly withdrawn inactive position.

2. A combination as defined in claim 1, wherein said outlet of said gob supplying means is aligned with said vertical axis of said rotatable means.

3. A combination as defined in claim 2, wherein each of said feed channels is movable in a vertical plane which includes said vertical axis of said rotatable means and the axis of the respective mold.

4. A combination as defined in claim 3, wherein said support means are connected to the respective feed channel at points of different elevations.

5. A combination as defined in claim 4, wherein said support means comprises an upper and a lower support means for each feed channel is pivotally connected at one end to said channel and including a positioning motor carried by said rotatable means and connected to said upper support means for periodically aligning said upper end of the respective feed channel with said outlet of said gob supply means.

6. A combination as defined in claim 5, wherein said positioning motor has an output member rotatable about an axis, and wherein each of said upper support means comprises an elongated first member having a longitudinal axis and being pivotally connected to the respective feed channel, means fixedly mounted on said rotatable means and guiding said first member reciprocable in the direction of its longitudinal axis but nonrotatable about said axis, an elongated second member connected to said output member of said positioning member for rotation therewith, and means connecting said first to said second member for moving said first member in direction of its axis during rotation of said second member.

7. A combination as defined in claim 6, wherein said first member has in a plane normal to its axis a non-circular cross section, wherein said guide means is provided with guide passage of corresponding cross section through which said first member extends, and wherein said connecting means comprises a female screw thread on one of said members and a male screw thread on the other of said members threadingly engaged with said female screw thread.

8. A combination as defined in claim 5, wherein the lower one of said support means for each feed channel is connected at one end to said channel for pivoting about an axis extending transverse to the elongation of the respective channel and including a second positioning motor carried by said rotatable means and connected to the other end of said lower support means for pivoting the respective channel about said one end of the respective upper support means so as to align the lower end of said channel with the axis of the respective mold.

9. A combination as defined in claim 8, wherein said second positioning motor has a second output member rotatable about an axis, wherein said lower support means comprises a sleeve member provided with a female screw thread and a spindle member provided with a male screw thread threadingly engaged with said female screw thread, one of said two last-mentioned members being connected to said channel and universal joint connecting the other of said two members to said second output member.

10. A combination as defined in claim 9, wherein each of said positioning motors is a reversible electric motor, and including a pair of cam means mounted on said rotatable means for turning therewith about said vertical axis, a pair of reversing switches for each of said positioning motors stationarily mounted for cooperation with said cam means and spaced in circumferential direction of said rotatable means from each other and in circuit with said motor for reversing the direction of rotation thereof, and a pair of stop switches for each of said positioning motors and respectively cooperating with the respective support means for stopping and starting the motor when the two members of the respective support means reach predetermined positions relative to each other.

11. A combination as defined in claim 10, wherein said two stop switches for said upper support means are mounted on said rotatable means spaced in longitudinal direction of said upper support means from each other and adjustable in this direction relative to each other, and including means on one of said two members of said upper support means for actuating said stop switches during movement of said two members relative to each other.

12. A combination as defined in claim 7, including connecting means comprising a female screw thread in said first member and a male screw thread on said second member threadingly engaged in said female screw thread, and wherein said actuating means comprises a cam projection on said first member.

13. A combination as defined in claim 10, wherein said two stop switches for said lower support means are mounted on said sleeve member spaced in longitudinal direction of the latter from each other and adjustable in said direction, and each having an actuating portion respectively projecting through openings in said sleeve member into the interior of the latter in the path of movement of said spindle member to be actuated by the same.

14. A combination as defined in claim 1, wherein the upper end of each feed channel moves along an endless path having a circular portion concentric with the axis of said rotatable means and an inwardly turned portion for aligning said upper end of the respective feed channel with said outlet, and wherein the lower end of each feed channel moves along an endless path having a circular portion concentric with said axis and an outwardly turned portion for aligning the lower end of the respective feed channel with the respective mold.

* * * * *